(12) United States Patent
Audemer et al.

(10) Patent No.: US 7,923,154 B2
(45) Date of Patent: Apr. 12, 2011

(54) CARBON-COATED LI-CONTAINING POWDERS AND PROCESS FOR PRODUCTION THEREOF

(75) Inventors: Albane Audemer, Lier (BE); Calin Wurm, Amiens (FR); Mathieu Morcrette, Amiens (FR); Sylvain Gwizdala, Brienon sur Armancon (FR); Christian Masquelier, Amiens (FR)

(73) Assignees: Umicore, Brussels (BE); Le Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 12/270,969

(22) Filed: Nov. 14, 2008

(65) Prior Publication Data
US 2009/0072203 A1    Mar. 19, 2009

Related U.S. Application Data

(62) Division of application No. 10/518,560, filed as application No. PCT/EP03/06628 on Jun. 19, 2003, now Pat. No. 7,618,747.

(60) Provisional application No. 60/392,978, filed on Jul. 2, 2002.

(30) Foreign Application Priority Data

Jun. 21, 2002 (EP) .................................... 02291562

(51) Int. Cl.
    *H01M 4/58* (2010.01)
(52) U.S. Cl. .................................. 429/231.95; 429/209
(58) Field of Classification Search .................. 429/221, 429/231.95; 427/122; 252/182.1
    See application file for complete search history.

(56) References Cited

U.S. PATENT DOCUMENTS

| 3,330,697 | A  | 7/1967  | Pechini         |
|-----------|----|---------|-----------------|
| 5,910,382 | A  | 6/1999  | Goodenough et al. |
| 6,667,133 | B1 | 12/2003 | Sumiya et al.   |
| 7,285,260 | B2 | 10/2007 | Armand et al.   |
| 2002/0047112 | A1 | 4/2002 | Hosoya et al. |
| 2002/0195591 | A1* | 12/2002 | Ravet et al. ................... 252/500 |

FOREIGN PATENT DOCUMENTS

| CA | 2270771 | 10/2000 |
| EP | 1184920 | 3/2002 |
| EP | 1261050 | 11/2002 |
| JP | 2000294238 | 10/2000 |
| JP | 2002075364 | 3/2002 |
| WO | 0227823 | 4/2002 |
| WO | 0227824 | 4/2002 |
| WO | WO 0227824 | 4/2002 |
| WO | 0244103 | 6/2002 |
| WO | 02099913 | 12/2002 |

OTHER PUBLICATIONS

Pekala et al., "Structure of Organic Aerogels. 1. Morphology and Scaling," Macromolecules, vol. 26, (1994), pp. 5487-5493.
Huang et al., "Approaching Theoretical Capacity of LiFePO4 at Room Temperature at High Rates," Electrochemical and Solid-State Letters, vol. 4, No. 10, (2001), pp. A170-A172.
Padhi et al., "Phospho-Olivines as Positive-Electrode Materials for Rechargeable Lithium Batteries," J Electrochemical Society, vol. 144, No. 4, (Apr. 1987).

* cited by examiner

*Primary Examiner* — Patrick Ryan
*Assistant Examiner* — Muhammad Siddiquee
(74) *Attorney, Agent, or Firm* — Brinks Hofer Gilson & Lione

(57) ABSTRACT

The invention provides a new route for the synthesis of carbon-coated powders having the olivine or NASICON structure, which form promising classes of active products for the manufacture of rechargeable lithium batteries. Carbon-coating of the powder particles is necessary to achieve good performances because of the rather poor electronic conductivity of said structures. For the preparation of coated $LiFePO_4$, sources of Li, Fe and phosphate are dissolved in an aqueous solution together with a polycarboxylic acid and a polyhydric alcohol. Upon water evaporation, polyesterification occurs while a mixed precipitate is formed containing Li, Fe and phosphate. The resin-encapsulated mixture is then heat treated at 700° C. in a reducing atmosphere. This results in the production of a fine powder consisting of an olivine $LiFePO_4$ phase, coated with conductive carbon. When this powder is used as active material in a lithium insertion-type electrode, fast charge and discharge rates are obtained at room temperature and an excellent capacity retention is observed.

3 Claims, 5 Drawing Sheets

CARBON-COATED LI-CONTAINING POWDERS AND PROCESS FOR PRODUCTION THEREOF

Figure 1:
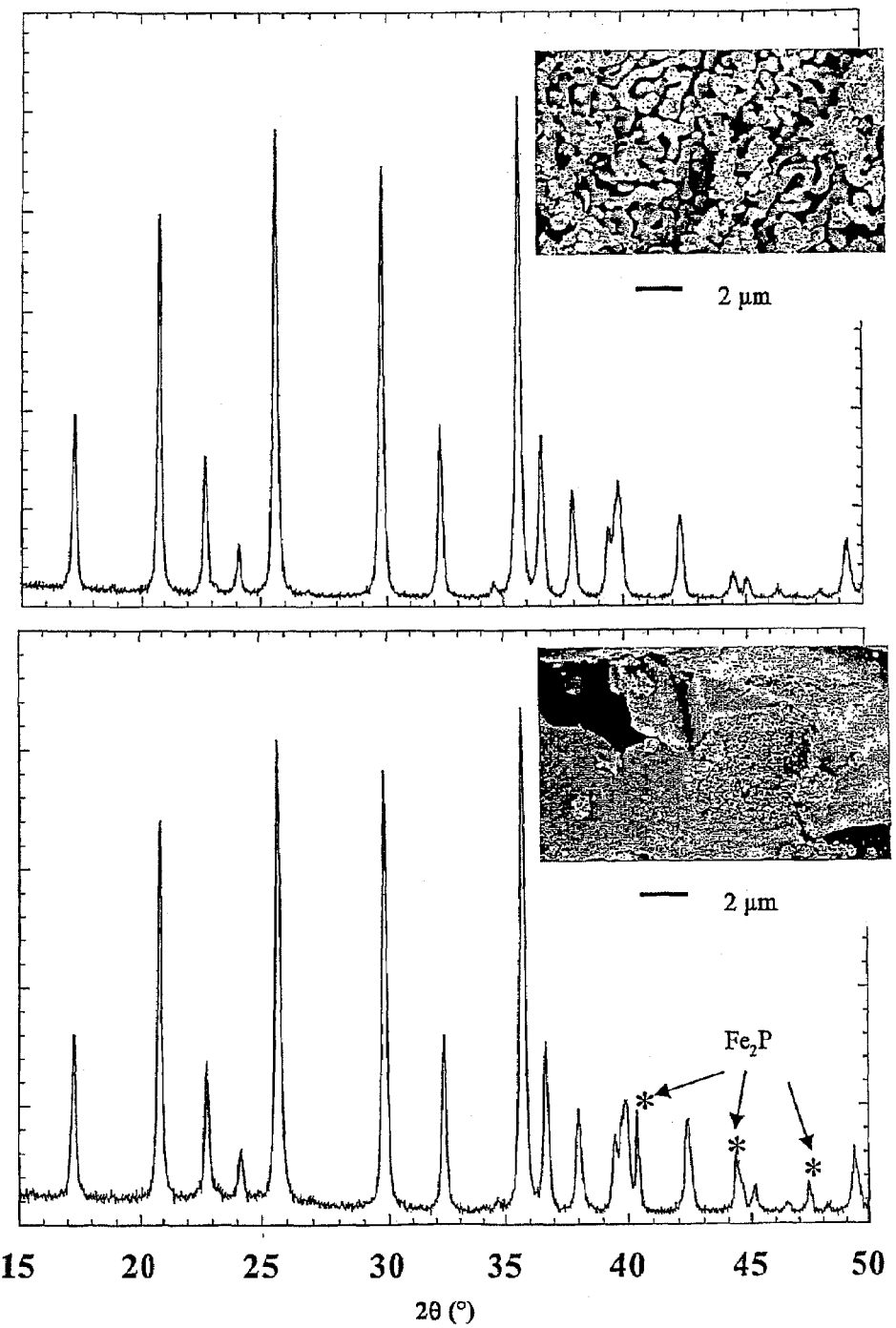

This application is a Divisional of U.S. application Ser. No. 10/518,560, filed Aug. 31, 2005, the entire contents of which is incorporated herein by reference.

The present invention relates to the field of rechargeable lithium batteries and to positive electrode materials operating at voltages greater than 2.8 V vs. $Li^+/Li$ in non-aqueous electrochemical cells. This invention relates in particular to the use of phosphates or sulphates of transition metals as positive electrodes and allows the manufacturing of powdered Li-containing olivine-like and NASICON-like material, with the particles efficiently coated with a controlled amount of conductive carbon.

Lithium secondary batteries are now widely used in consumer electronics. They benefit from the light weight of Li and from its strong reducing character, thus providing the highest power and energy density among known rechargeable battery systems. Lithium secondary batteries are of various configurations depending on the nature of the electrode materials and of the electrolyte used. The commercialised Li-ion system, for instance, uses $LiCoO_2$ and Carbon graphite as positive and negative electrodes, respectively with $LiPF_6$ in EC/DEC/PC as a liquid electrolyte. The operating voltage of the battery is related to the difference between thermodynamic free energies within the negative and positive electrodes. Solid oxidants are therefore required at the positive electrode, the materials of choice, up to now, being either the layered $LiMO_2$ oxides (with M is Co or Ni) or the 3-dimensional spinel structure of $Li[Mn_2]O_4$. Extraction of Li from each of these three oxides gives access to $M^{4+}/M^{3+}$ redox couples located between 3.5 to 5 V vs. $Li^+/Li$.

Three-dimensional framework structures using $(XO_4)^{n-}$ polyanions have been proposed recently (U.S. Pat. No. 5,910,382) as viable alternatives to the $LiM_xO_y$ oxides. $LiFePO_4$ and $Li_3Fe_2(PO_4)_3$ in particular are the most promising Fe-containing materials that can work at attractive potentials vs. $Li^+/Li$ (3.5 V and 2.8 V respectively). Both compounds operate on the $Fe^{3+}/Fe^{2+}$ redox couple which take advantage from the inductive effect of the $XO_4^{n-}$ groups that diminishes the strength of the Fe—O bond compared to a simple oxide.

Pioneering work by Padhi (Padhi et al., *J. Elec. Soc.* 144 (4)) demonstrated the reversible extraction of Li from the olivine-structured $LiFePO_4$ prepared by solid state reaction at 800° C. under Ar atmosphere, starting from $Li_2CO_3$ or $LiOH.H_2O$, $Fe(CH_3COO)_2$ and $NH_4H_2PO_4.H_2O$. Unfortunately, probably due to kinetic limitations of the displacement of the $LiFePO_4/FePO_4$ interface, only 60-70% of the theoretical capacity of 170 mAh/g of active material, was achieved, whatever the charge or discharge rate applied. Indeed, the use of high synthesis temperatures leads to the formation of large particles in which ionic and electronic conductivity is the limiting factor. Several research groups recently reported improvements in the effective reversible capacity of $LiFePO_4$ by decreasing the particle size. This can be done by using highly reactive $Fe^{II}$ precursors (JP 2000-294238 A2), or by using a solution route (WO 02/27824 A1), thus allowing $LiFePO_4$ formation at lower temperatures compared to the solid state route described by Padhi.

The poor electronic conductivity of the product can be improved by coating the particles with conductive carbon. This has been done by ball milling $LiFePO_4$ and carbon (Huang et al., *Electrochem. Solid-State Lett.*, 4, A170 (2001)) or by adding a carbon containing compound to already made $LiFePO_4$ and proceeding to a subsequent calcination at about 700° C.(CA 2,270,771). Carbon, and preferably amorphous carbon, can also be introduced in the $LiFePO_4$ synthesis process, being mixed with the solid synthesis precursors before calcination (EP 1184920 A2).

The main problems that may jeopardise the effective use in a positive electrode for Li batteries of Li-containing olivine or NASICON powders such as $LiFePO_4$ or other components mentioned by Goodenough et al. in U.S. Pat. No. 5,910,382, arises from their low electronic conductivity and from the fact that both end-members of the de-intercalation process (e.g. $LiFePO_4$ and $FePO_4$) are poor ionic conductors.

As described above, adding carbon, thereby coating the particles with a conductive layer, alleviates the electronic conductivity problem. However, high amounts of carbon are needed. Whereas carbon does not participate in the redox reactions useful for the operation of the battery, a strong penalty for the overall specific capacity of the composite positive electrode is paid. This is illustrated in JP 2000-294238 A2 wherein a $LiFePO_4$/Acetylene Black ratio of 70/25is used.

The ionic conduction problem can be solved by producing very fine-grained particles. Using a solution route synthesis has been found to be advantageous compared to the classic solid synthesis route. This solution route has been described in EP1261050. This route provides for a very finely divided, homogeneous precursor which needs only moderate conditions of temperature and time to react to the desired crystalline structures. Thanks to the moderate conditions, grain growth, leading to unwanted coarse particles, is avoided. After synthesis, such a powder has to be ball-milled with a relatively large quantity of conductive carbon, typically amounting to 17 wt. %.

This invention provides for an improved solution route, ensuring the production of fine grained particles efficiently covered with a conductive carbon layer. Compared to prior art powders, the obtained powders deliver exceptional performances when used in Li-ion batteries. The invention provides for a powder that needs much less total carbon in the electrode for a similar electrode capacity and discharge rate. Similarly, the invention provides for a powder that provides higher capacity and discharge rate when using the same amount of total carbon in the electrode.

A new process is presented for preparing a carbon-coated Li-containing olivine or NASICON powder, comprising the steps of preparing a water-based solution comprising, as solutes, one or more Li-containing olivine or NASICON precursor compounds and one or more carbon-bearing monomer compounds, precipitating a Li-containing olivine or NASICON precursor compounds and polymerising the monomer compounds in a single step, heat treating the obtained precipitate in a neutral or reducing environment so as to form a Li-containing olivine or NASICON crystalline phase and decompose the polymer carbon.

The process is specially suitable for the preparation of $Li_uM_v(XO_4)_w$ with u=1, 2 or 3, v=1 or 2, w=1 or 3, M is $Ti_aV_bCr_cMn_dFe_eCo_fNi_gSc_hNb_i$ with a+b+c+d+e+f+g+h+i=1 and X is $P_{x-1}S_x$ with $0 \leq x \leq 1$.

It is clear that the individual 'a' to 'i' parameters have values going from 0 to 1. Obviously, their particular values should allow for electroneutrality of the crystalline phase when combined with a proper set 'a', 'v' and 'w' parameters. Examples are: $LiMPO_4$ such as in $LiFePO_4$, $LiNiPO_4$, $LiMnPO_4$; $LiM_2(PO_4)_3$ such as in $LiTi_2(PO_4)_3$, $LiFeNb(PO_4)_3$;

$Li_2M_2(PO_4)_3$ such as in $Li_2FeTi(PO_4)_3$; $Li_3M_2(PO_4)_3$ such as in $Li_3Ti_2(PO_4)_3$, $Li_3Sc_2(PO_4)_3$, $Li_3Cr_2(PO_4)_3$, $Li_3In_2(PO_4)_3$, $Li_3Fe_2(PO_4)_3$, $Li_3FeV(PO_4)_3$.

The invented process is especially suitable for the preparation of coated $LiFePO_4$.

The precipitation of Li-containing olivine or NASICON precursor compounds and the polymerisation of the monomers can be performed by evaporating water from the water-based solution. The carbon-bearing monomer compounds can be a polyhydric alcohol and a polycarboxylic acid, such as, respectively, ethylene glycol and citric acid.

When the synthesis of coated $LiFePO_4$, is envisaged, equimolar amounts of Li, Fe and phosphate, such as $LiH_2PO_4$ and $Fe(NO_3)_3$, are dissolved in water together with a polyhydric alcohol and a polycarboxylic acid, the water is then evaporated at a temperature between 60 and 100° C., and a heat-treatment is performed at a temperature between 600 and 800° C., preferably between 650 and 750° C.

The object of the invention also concerns a carbon-coated $LiFePO_4$ powder for use in Li insertion-type electrodes, which, when used as an active component in a cathode cycled between 2.0 and 4.5 V against a Li anode at a discharge rate of C/5 at 25° C., is characterised by a reversible electrode capacity expressed as a fraction of the theoretical capacity and a total carbon content of
at least 75% capacity and less than 4 wt. % carbon, or,
at least 80% capacity and less than 8 wt. % carbon.

Other objects of the invention are: an electrode mix containing the above-mentioned carbon-coated $LiFePO_4$ and batteries containing the latter electrode mix.

For a proper understanding of the invention as described herein, the following definitions are to be considered.

A "Li-containing olivine or NASICON precursor compound" is to be understood as a metal-bearing compound such as a salt, oxide or hydroxide of one or more metals susceptible to be converted to, or to react to, the desired final compound. Typically, the conversion or reaction is performed by applying a thermal treatment A "carbon-bearing monomer compound" is to be understood as an organic compound susceptible to polymerise with itself (to form a homopolymer) or together with other monomers (to form a copolymer).

A "reducing environment" can be obtained by using a reducing gas, or by relying on reducing properties of solids, such as carbon, present in the bulk of the material.

The "electrode capacity expressed as a fraction of the theoretical capacity" is the ratio of the capacity of the active product contained in the electrode, to the theoretical capacity of the active product. For $FeLiPO_4$, a specific theoretical capacity of 170 mA/g is assumed.

When the charge or discharge rate is expressed as C/x, this means that one Li per $LiFePO_4$ is exchanged in 'x' hour.

The general principle of the invention can be applied whenever a high quality carbon coating is needed on a metal-bearing powder. Olivine and NASICON phases, when used in rechargeable Li-ion batteries, are known to be rather poor electronic conductors. As such, they particularly benefit from a carbon coating which is rendered conductive by a suitable heat treatment.

It is assumed that the metal bearing precursors, such as Li, metal and phosphate or sulphate ions, are trapped homogeneously on the atomic scale throughout the chelating polymer matrix. Such a structure eliminates the needs for long range diffusion during the subsequent formation of the crystalline phase. Therefore, at relatively low temperature, the precursors can form a homogeneous single phase of precise stoichiometry, intimately coated by a conductive carbonaceous network.

Solvent evaporation conducting to an homogeneous mix of solid precursor compounds and the polymerisation of the monomers are performed in one single step. This requires the polymerisation to occur simultaneously with the solidification of at least part of the precursor.

Different means can be employed to form the homogeneous mix of precursor (e.g. change in pH, temperature) and to trigger the polymerisation (e.g. addition of catalyst, UV). However, when the polymerisation reaction produces water as a condensate, both the precipitation of the precursor and the polymerisation are triggered by identical means, i.e. by removal of water from the reaction vessel. This results in a particularly simple and efficient process.

It has been found that the presence of heteroatoms (i.e. atoms other than C, O and H) in the monomers may degrade the performance of the obtained carbon coating, in particular its electrical conductivity. It is therefore preferred to use monomer compounds containing only C, Q and H atoms.

When the production of $LiFePO_4$ is envisaged, the Fe source in the precursor compound can be $Fe^{II}$ or $Fe^{III}$: the reducing conditions needed to avoid the burning of the carbon coating during the step of heat treatment ensures the conversion of any $Fe^{III}$ to the required $Fe^{II}$ state.

The preferred water evaporation temperature range is 60 to 100° C. This ensures that the precipitation of the precursor compound and the polymerisation reaction occur at least partly simultaneously.

The conductivity of the carbon residue is enhanced when the heat treatment is performed at 600° C. or higher. However, a temperature of more than 800° C. may degrade the quality of the product because of grain-growth or because of excessive reduction by carbon. A heath treatment at 650 to 750° C. is preferred.

The positive electrode of the electrochemical cell is made of optimised $LiFePO_4$ particles intimately mixed with an electronically conducting carbon species made as described below. The active material/coated-carbon ratio can be adjust in the synthesis of $LiFePO_4$ between 1 and 25 wt % of carbon. It is preferred to minimise the relative amount of carbon, whether present as coating material or as carbon added during the manufacture of the electrode. Indeed, carbon does not participate in the redox reactions and therefore represents inert mass reducing the specific capacity of the electrode. Nevertheless, it is desired to have at least 2 wt. % of coated carbon to exploit the invention fully.

The invention is illustrated by the preparation of optimised $LiMPO_4$ particles, coated with (electronic) conductive carbon through low-temperature chemical routes.

For the preparation of a $LiFePO_4/C$ composite, an aqueous solution containing Fe, Li and phosphate is prepared using e.g. $Fe(NO_3)_3.9H_2O$ and $LiH_2PO_4$. The solution is added under stirring in air to an aqueous solution of citric acid. Ethylene glycol is then added to the solution for an ethylene glycol/citric acid molar ratio of 1/1. The precursor to carbon ratio in the solution will determine the relative amount of carbon in the coating. Key to this process are the fact that both the $LiFePO_4$ precursors and the monomers are to be water-soluble.

In a second step, the water is slowly evaporated at 80° C. under air. When nearly dry, the solution turns to a gel due to the polymerisation between citric acid and ethylene glycol. The gel is dried by maintaining it at 80° C. A very homogeneous mixture, containing Li, Fe and phosphate in the stoichiometric proportions of $LiFePO_4$ together with the carbon bearing polymer, is then produced. Advantageously, monomers are chosen which have a lower partial pressure than water at the drying temperature. Premature evaporation of the monomers is thus avoided.

In a third step, the homogeneous mixture is progressively heat-treated under a reducing atmosphere ($N_2/H_2$, 10% $H_2$) to yield, at a temperature of about 500° C., a crystalline LiFePO$_4$ phase coated with a controlled amounts coated carbon. However, at 500° C., the coated carbon is partly insulating. A treatment between 600° C. and 800° C. is thus preferred as it yields conductive carbon. Thanks to the presence of carbon, the surrounding environment of LiFePO$_4$ is strongly reducing. This is useful to reduce remaining traces of $Fe^{III}$ precursors to $Fe^{II}$, but can lead to unwanted results when the percentage of carbon is high. Indeed, high carbon contents (more than 15%) combined with prolonged treatment (more than 5 hours) at 700 to 800° C. partly reduces $Fe^{II}$ in LiFePO$_4$ to $Fe^0$. This leads to the formation of impurities such as Fe$_2$P. As determined by electrochemical titration, the obtained optimised powder may still contain a small amount of $Fe^{III}$ (less than 3 M %), an amount which is in fact inferior to that obtained in the synthesis of pure LiFePO$_4$ without carbon. The result of the heat treatment can easily be monitored and optimised by e.g. X-ray diffraction or by Mossbauer spectroscopy, to ensure that $Fe^{III}$ is nearly completely reduced to $Fe^{II}$ and that no significant amount of $Fe^{II}$ is reduced to $Fe^0$.

The invention is illustrated by the following examples. Four LiFePO$_4$/C composites were produced according to the process described above. Aqueous solutions containing 0.4 M/l Fe, Li and phosphate and 0.1 to 1 M/l ethylene glycol and citric acid were prepared using Fe(NO$_3$)$_3$.9H$_2$O and LiH$_2$PO$_4$. The solutions were dried for 12 h at 80° C. The dry residues were then heat treated for 10 h at 700° C. under a $N_2/H_2$ atmosphere with 10% $H_2$.

The results, presented in Table 1, show the influence of the monomer concentrations in the solution on the amount of carbon coated on the LiFePO$_4$ particles. The apparent loss of carbon, which is rather high compared to the theoretical amount expected, comes probably from the reduction of $Fe^{III}$ to $Fe^{II}$ during the heat treatment. The polymerisation needs not be complete.

TABLE 1

Theoretical vs. observed amount of carbon in the coating as a function of the monomer concentration in the solute
(for 0.1 M/l of Fe, Li and phosphate in the solute)

| Citric acid (M/l) | Ethylene glycol (M/l) | Theoretical C (wt. %) | Observed C (wt. %) |
|---|---|---|---|
| 0.1 | 0.1 | 13.2 | 0.33 |
| 0.2 | 0.2 | 23.3 | 3.6 |
| 0.4 | 0.4 | 37.8 | 8.6 |
| 1 | 1 | 60.3 | 24 |

FIGS. 1 to 5 illustrate the invention.

FIG. 1: X-ray diffractograms (CuKα) and the S.E.M. photographs of two LiFePO$_4$ powders coated with 3.6 (top) and 24% (bottom) carbon FIG. 2: Electrochemical response of a Li/LiPF$_6$ EC:DMC/LiFePO$_4$ electrochemical cell (swagelok type) cycled at C/5 and 25° C., using LiFePO$_4$ with 3.6 (top) and 24% (bottom) of coated carbon FIG. 3: Results obtained with Li/LiPF$_6$ EC: DMC/LiFePO$_4$ electrochemical coin cells embedded in a plastic film. LiFePO$_4$ with 3.6% of coated carbon cycled at C/5 and 25° C. (A) or 55° C. (B); LiFePO$_4$ prepared according to the prior art solution route and ball-milled with 17% of conductive carbon cycled at C/10 and 55° C. (C)

Figure 4:
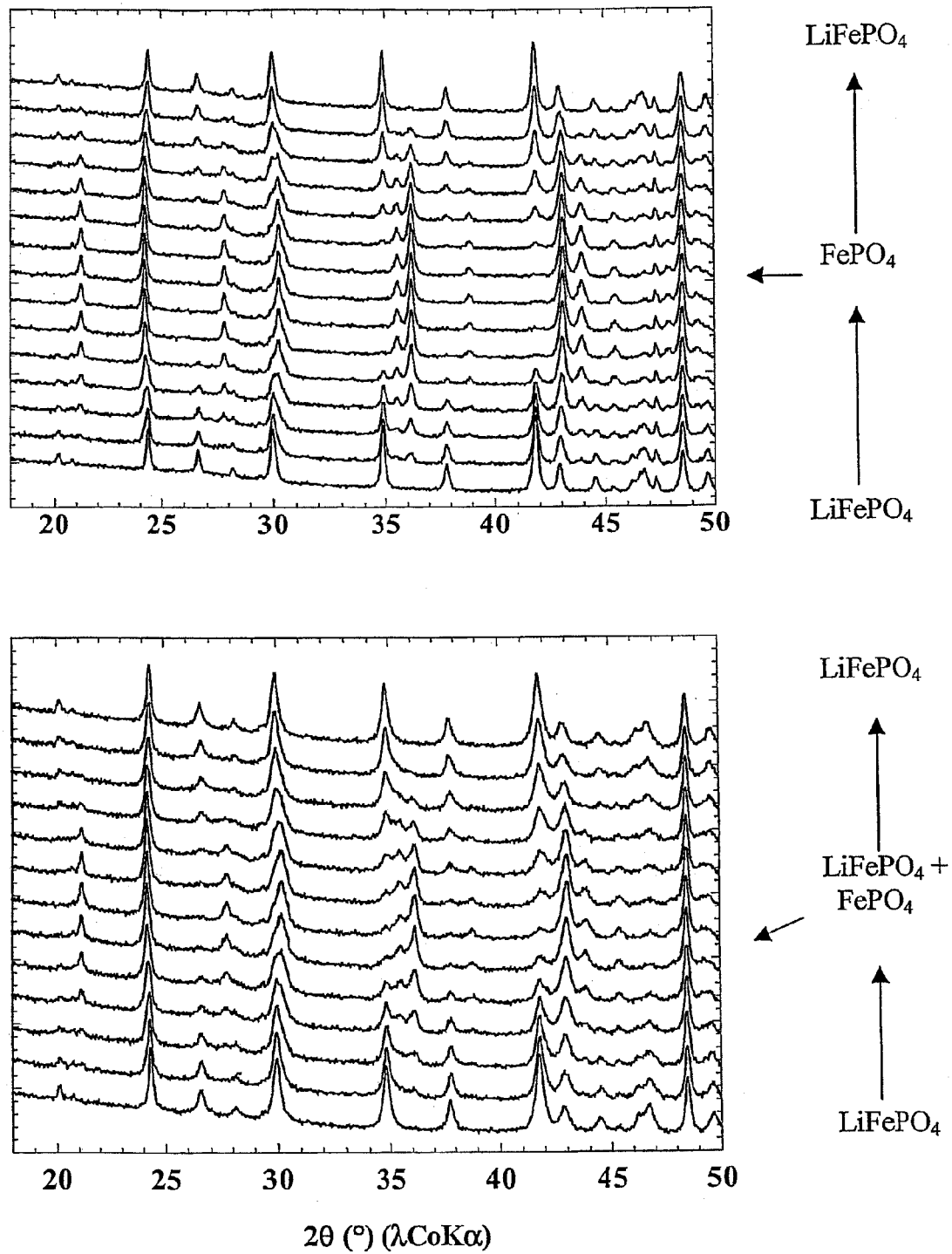

FIG. 4: In situ ED patterns of LiFePO$_4$ in a Li/LiPF$_6$ EC:DMC/LiFePO$_4$ electrochemical cell cycled at C/5 and 25° C.; LiFePO$_4$ prepared according to the invention (top) and according to the prior art solution route and ball-milled with 17% of conductive carbon (bottom)

Figure 5:
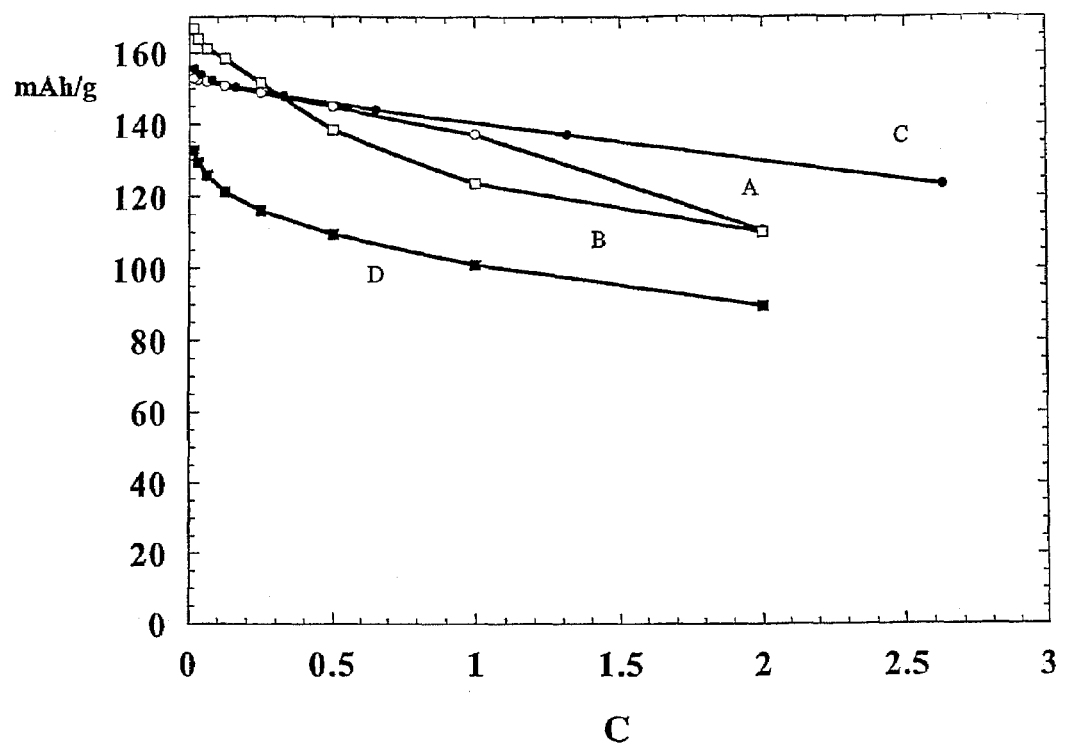

FIG. 5: Evolution of the specific active material capacity achieved in a Li/LiPF$_6$ EC:DMC/LiPePO$_4$ prepared according to the invention with 3.6 (B) and 24% (C) of coated carbon; LiFePO$_4$ prepared according to the prior the art solution route and ball-milled with 17% of conductive carbon (I); commercial LiCoO$_2$ are shown for comparison (A)

FIGS. 1 to 5 are now discussed in more details. The X-ray diffractograms and the S.E.M. photographs of two LiFePO$_4$ powders coated with 3.6 and 24%.of carbon are given in FIG. 1. The photographs are representative for the overall powder. For LiFePO$_4$ with 3.6% of coated carbon, the network formed by the coated particles is very well spaced and regular. The particles are sufficiently fine (around 1 μm) to alleviate the penalising displacement length of the interface between LiFePO$_4$ and FePO$_4$, while enough space is left for species to migrate. For 24% of coated carbon, the carbon matrix itself can be observed. The carbon network surrounds the LiFePO$_4$ particles whose size is even smaller than in the former case. The LiFePO$_4$ phase appears to be pure when 3.6% of carbon is coated. When 24% is coated, some LiFePO$_4$ is reduced to Fe$_2$P after 10 h at 700° C. This demonstrates that the higher the carbon percentage, the more efficient the reduction.

Figure 2:
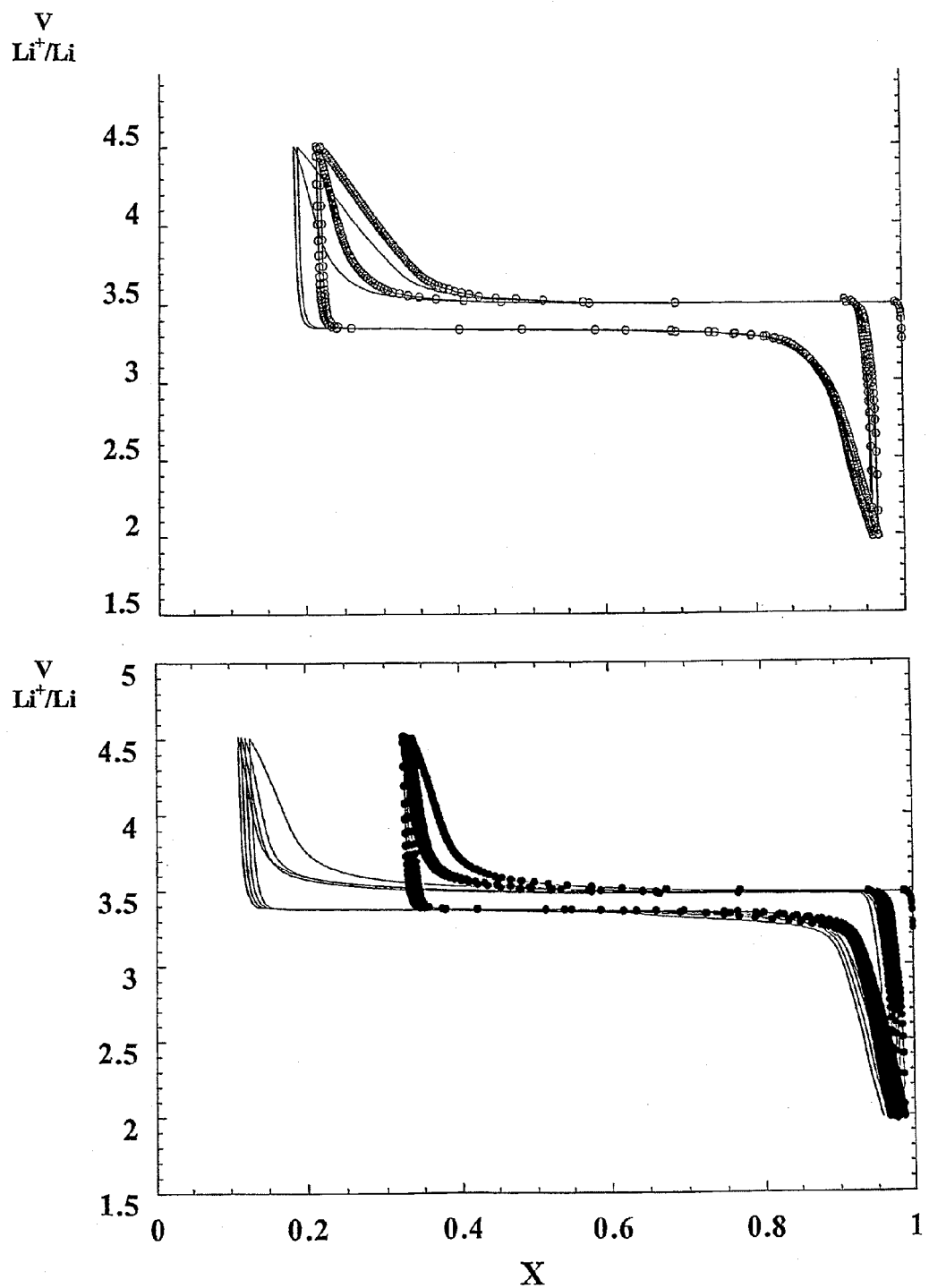

These powders give the electrochemical response shown in FIG. 2. The electrochemical cells were built in Swagelok configuration with Li metal pasted on a Ni foil as the negative electrode, and LiPF$_6$ in EC:DMC as the electrolyte. The positive electrode is the powder obtained directly from the described process. The signature of FIG. 2 (voltage as a function of x in Li$_x$FePO$_4$) was obtained at 25° C. for an equivalent charge/discharge rate of C/5, i.e. I Li extracted or inserted in 5 h.

About 85% of the theoretical capacity of the active material can be achieved when using 24% of coated carbon. The performance of the total electrode is however rather penalised by the large quantity of carbon. The amount of carbon can be dramatically decreased. When using 3.6% of coated carbon, 78% of the capacity is still achieved. In each case, the irreversible capacity at first cycle is very small.

Figure 3:
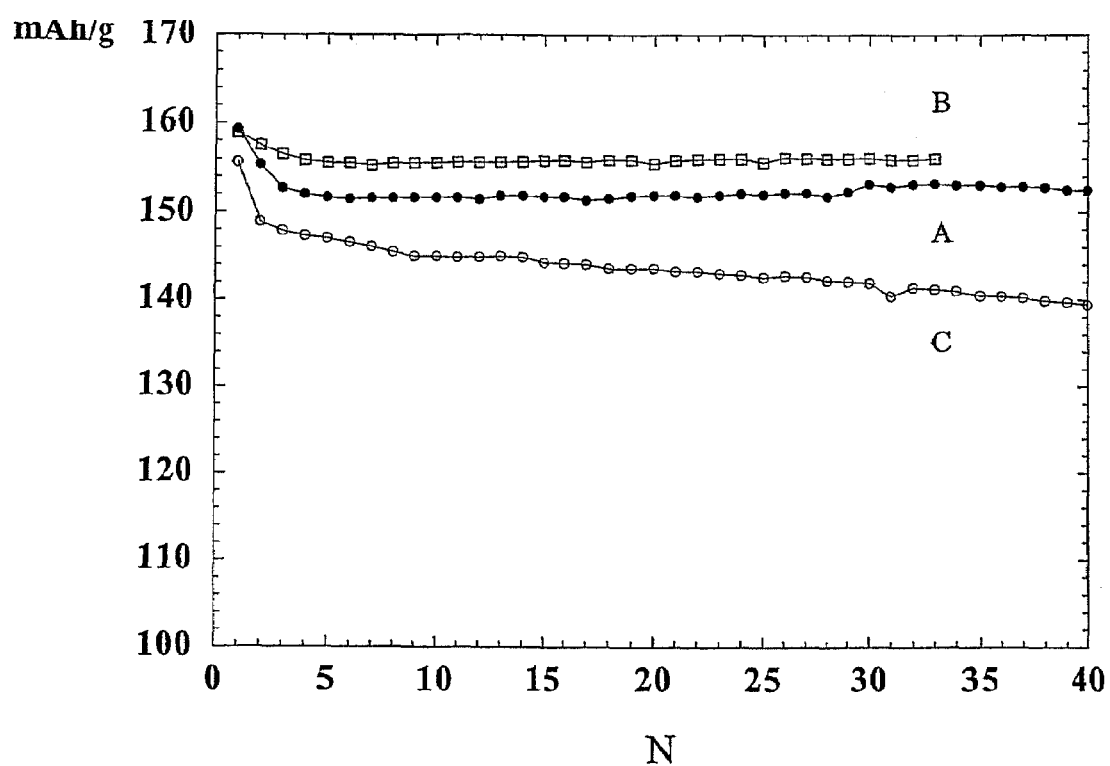

FIG. 3 illustrates the stability of the LiFePO$_4$ composite produced according to the invention using 3.6% of coated carbon. This material was cycled at C/5 at 25 and at 55° C. The resulting specific capacity is superior to that obtained with uncoated material prepared according to the prior art solution route and ball-milled with 17% of conductive carbon. If we compare the specific capacities of the total electrodes, the superiority of the invented process becomes even more apparent thanks to the much lower amount of total carbon.

In FIG. 4, in situ X-ray diffraction patterns are shown for a full charge/discharge cycle. With the powder coated according to the invention, at the end of the charge cycle, all the diffraction peaks of LiFePO$_4$ disappear at the benefit of triphylite-FePO$_4$ peaks. The biphasic phenomenon is thus complete. However, with powder prepared according to the prior art solution route, this is not the case.

In FIG. 5, the specific capacity of several active materials is reported in function of the cycling rate. Materials tested are: LiFePO$_4$ composite obtained by the process according to the invention with 3.6 and 24% of coated carbon, LiFePO$_4$ prepared according to the prior art solution route and ball-milled with 17% of conductive carbon, and commercial LiCoO$_2$.

The 3.6% carbon-coated $LiFePO_4$ performs better than any other at low discharge rates. At higher rates, it is outperformed by $LiCoO_2$ (a much more expensive product), and, as expected, by 24% carbon-coated $LiFePO_4$. Indeed, the higher amount of coated carbon tends to improve the high current performance. Whatever the conditions, however, the products which are carbon-coated according to the invention remain superior to the prior art product.

The invention claimed is:

1. A carbon-coated $LiFePO_4$ powder for use in Li insertion-type electrodes, which, when used as an active component in a cathode cycled between 2.0 and 4.5 V against a Li anode at a discharge rate of C/5 at 25° C., is characterized by a reversible electrode capacity expressed as a fraction of the theoretical capacity and a total carbon content of
   at least 75% capacity and less than 4 wt. % carbon, or,
   at least 80% capacity and less than 8 wt. % carbon.

2. Electrode mix containing carbon-coated $LiFePO_4$ for use in Li insertion-type electrodes, which, when used as an active component in a cathode cycled between 2.0 and 4.5 V against a Li anode at a discharge rate of C/5 at 25° C., is characterized by a reversible electrode capacity expressed as a fraction of the theoretical capacity and a total carbon content of
   at least 75% capacity and less than 4 wt. % carbon, or,
   at least 80% capacity and less than 8 wt. % carbon.

3. A battery containing an electrode mix containing carbon-coated $LiFePO_4$ for use in Li insertion-type electrodes, which, when used as an active component in a cathode cycled between 2.0 and 4.5 V against a Li anode at a discharge rate of C/5 at 25° C., is characterized by a reversible electrode capacity expressed as a fraction of the theoretical capacity and a total carbon content of
   at least 75% capacity and less than 4 wt. % carbon, or,
   at least 80% capacity and less than 8 wt. % carbon.

* * * * *